Figure 1:
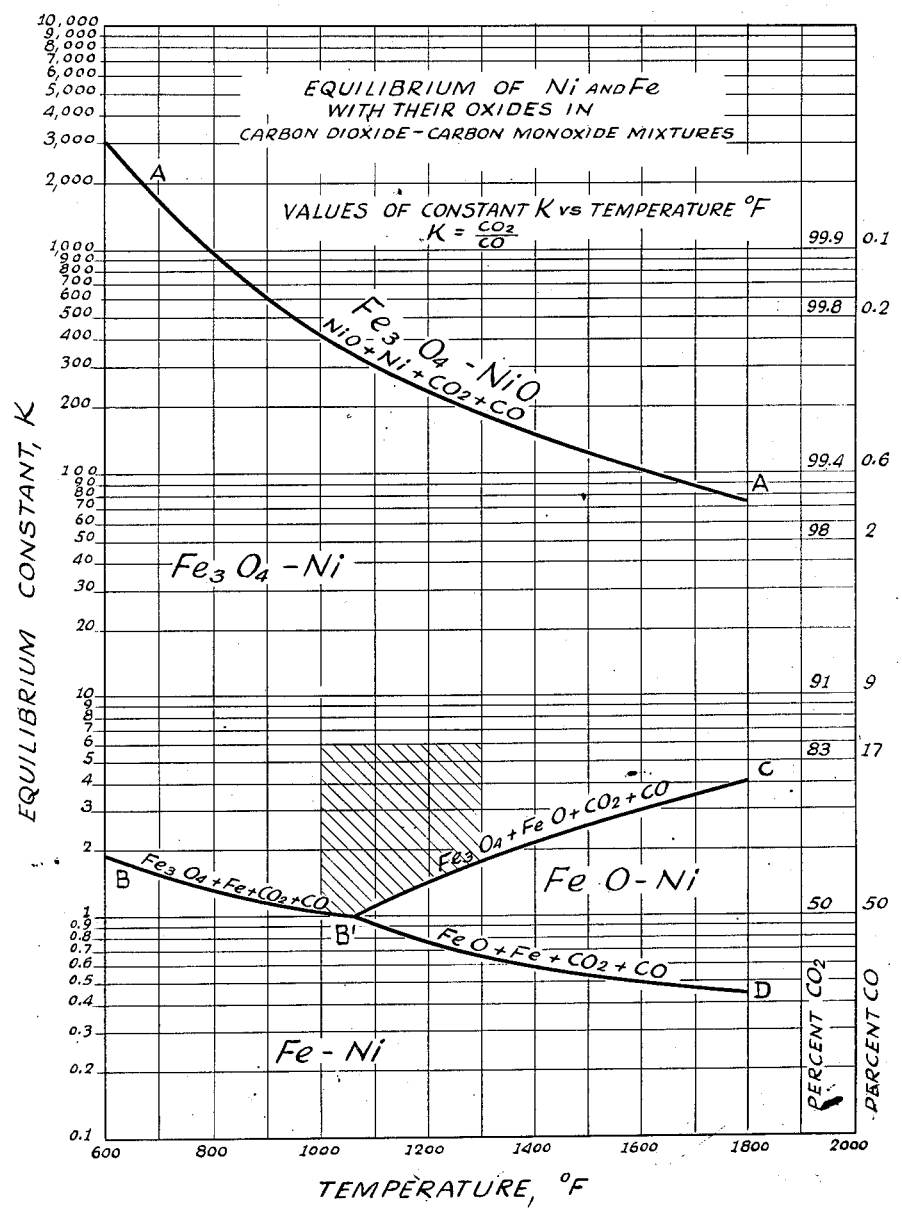

June 21, 1949.  R. C. HILLS ET AL  2,473,795
REDUCTION OF ORES CONTAINING NICKEL Filed May 10, 1944  4 Sheets-Sheet 1

INVENTORS
ROBERT C. HILLS
MAURICE F. DUFOUR
BY
Hammond & Littell
ATTORNEYS

Patented June 21, 1949

2,473,795

UNITED STATES PATENT OFFICE 2,473,795

REDUCTION OF ORES CONTAINING NICKEL

Robert C. Hills and Maurice F. Dufour, Nicaro, Cuba, assignors to Nicaro Nickel Company, New York, N. Y., a corporation of Delaware Application May 10, 1944, Serial No. 534,878

7 Claims. (Cl. 75—82)

This invention relates to the recovery of metals from ores and particularly, to a process for the reduction and recovery of nickel from nickel-bearing oxygenated mineral ores containing iron in oxidized form, which ores are lateritic in character and contain up to about 2 per cent nickel and varying percentages of iron ranging from about 10 to 60 per cent.

The invention is in part an improvement over, and in part a supplement to, the invention described in United States Patent Number 2,400,098 issued to Vas Hubert Brogdon May 14, 1946. The process in said prior application involves a novel thermal-reduction step wherein the ore containing the nickel and iron is reduced under certain specific conditions found to convert selectively all or a substantial part of the nickel to a form capable of being extracted by leaching with ammoniacal solutions. This thermal-reduction step is revealed more in detail in the following description of a complete preferred process.

As disclosed in said prior application, lateritic ore such as is found in Cuba in substantial amounts containing nickel, iron, and other metals in small amounts, after being dried to reduce its moisture content and ground to a finely divided condition, is pre-heated at a gradual rate which avoids agglomeration to a temperature below that at which decomposition of the nickel compounds occurs or to about 1000° F., and then is subjected to heating and reducing gases in a volume which causes the temperature to increase at a slow rate, preferably at a rate restricted to about 6° or less per minute when the temperature is increasing to a final temperature between about 1100° and 1400° F., or even higher temperatures. The reducing gases are introduced separately or along with the heating gases such that they pass over and through the ore and reduce the nickel content. The amounts of producer gas and heating or combustion gas introduced into the bottom of the furnace in the opposite direction to the flow of ore introduced at the top are adjusted such that the ratio of carbon monoxide and hydrogen to carbon dioxide and water vapor is in the volumetric proportion of 30-70 per cent of the former two to 70-30 per cent of the latter two. When the reduction step is substantially complete, the ore after being cooled under substantially nonoxidizing conditions, is subjected to an extraction process using an ammoniacal leach liquor whereby the nickel content is dissolved and removed and the iron content is almost completely retained in the ore.

The purpose of the present invention is to provide a process for effecting ore reduction operations of the above described general character in a more efficient manner with respect to heat consumption, reducing gas consumption, and time of operation, while at the same time obtaining maximum reduction of the nickel content and minimum reduction of the iron content. A specific object is to provide a heating system capable of effecting gradual elevation of the temperature of the ore at a controlled rate in which positive control and optimum composition of the reduction atmosphere in contact with the ore during the reduction may be independently maintained, both within economical limitations.

Since the composition of reducing atmosphere in the reduction furnace necessary for optimum results varies with the percentage of iron in the ore being treated and the lateritic ores even from the same deposit contain widely varying percentages of iron, a specific and important object of the present invention is to provide a reduction process and apparatus capable of quick and easy adjustment to accomplish efficient reduction of the ore as the iron content varies in continuous recovery operations.

Experimentation conducted by the present applicants and their associates has revealed that although the selective reduction of nickel in the lateritic ores in ordinary furnaces and under the heating and reducing characteristics defined in said prior application is effectively accomplished, commercial acceptance of the process requires more complete control of the temperature and the reducing atmosphere, as well as greater flexibility.

In the reduction of ores in the conventional furnace constructions employed, the reducing gases and heating gases are introduced at one point usually the bottom and after accomplishing their intended functions are passed out of an outlet usually at the top. The heating gases are frequently provided by combustion of part of the producer gas within the body of the ore. The present applicants have discovered that the parabolic temperature path of the ore in this ordinary furnace operation does not permit optimum heating and reduction conditions in the recovery of nickel from nickeliferous lateritic ores containing iron. In these furnaces the volume and temperature of the heating gases are regulated to heat the ore to the desired temperature without obtaining control of the temperature distribution in a batch furnace or of the temperature path in a continuous type furnace. In accordance with the preferred embodiment of the present invention, this controlled heating is most effectively accomplished by the employment of a multiple-hearth furnace of the construction hereinafter described.

In this multi-hearth furnace, the ore is introduced at the top and, after heating and reduction, is discharged from the bottom, the heating being effected by introducing externally produced combustion or flue gases at one or more levels between the ore inlet and ore outlet. Since the combustion gases introduced contain carbon dioxide and water vapor, the problem of heating the ore is intimately tied up not only with the temperature but also with the problem of providing optimum reduction characteristics in the gases throughout the furnace. Hence successful operation of the furnace with respect to control of the reduction atmosphere in the present process takes into consideration the combustion gases introduced and allows for them in determining the amount of reducing gases required to obtain the optimum reduction conditions at all levels in the reduction zone of the furnace, as hereinafter described.

In the preferred reduction process of the invention, the quantity of reduction gases employed is maintained at the operable minimum not only because of the high cost of producer gas but also, and of even more importance, because of the effect of high producer gas concentrations in reducing iron to a point where the selective solvent action of ammoniacal leaching solutions is inhibited. On the other hand, the amount of reduction gases employed is sufficient to accomplish the reduction of the nickel content in the period of time permitted by a thermally efficient furnace construction.

The economic advantage in avoiding reduction atmospheres which accomplish to any substantial extent the reduction of the iron content is clear from the fact that one mol of iron or 55.84 pounds in the form of its ferric oxide takes up 570 cubic feet of carbon monoxide in being reduced all the way to the metallic iron, 190 cubic feet of carbon monoxide in being reduced to the ferrous oxide state, and only 63.3 cubic feet in being reduced to the ferroso-ferric oxide stage, all of which reducing gas goes to waste.

The applicants have discovered that the reduction of the nickel content to a state in which the nickel is readily dissolved in ammoniacal solution cannot be accomplished without reducing the iron at least to the ferroso-ferric oxide state, and that the nickel can be reduced to such stage without reducing the ferric oxide content of the ore to the ferrous oxide or metallic state to any substantial degree. This end can be attained only by complete control over the temperature and the reducing atmosphere through the furnace. With this control, higher yields of nickel are obtained and substantial consumption and waste of carbon monoxide by the iron content are avoided.

Since the reduction of nickel oxide to nickel and the reduction of ferroso-ferric iron to ferrous oxide and thence to iron are each reversible reactions and depend on the content of the surrounding gas for direction and relative velocity, such reactions can be controlled by regulating the composition of the surrounding gas. The controlling characteristics of the surrounding gas lie in the relative quantities of carbon dioxide and water vapor on the one hand and carbon monoxide and hydrogen on the other. The effect of the hydrogen contained in the producer gas and the water vapor contained in the heating or combustion gases is to permit operation at slightly lower ratios of carbon dioxide to carbon monoxide without the undesirable production of metallic iron which would be encountered at the same values if the hydrogen and the water were not present. The explanation of the reduction phenomena is made somewhat more simple by confining the herein-contained discussion to the carbon dioxide and carbon monoxide constituents, but it should not be overlooked that in actual operation, the hydrogen and water vapor present also participate in like manner. Since the carbon dioxide and carbon monoxide are the principal gases controlling the oxidation and reduction reactions, these gases alone, and merely for convenience, will be hereinafter referred to in designating the ratios of reducing to oxidizing gases.

In accordance with the present invention, the reduction of the nickeliferous lateritic ores is accomplished by maintaining the ratio quotient of carbon dioxide to carbon monoxide by volume between .4 and 4 under the temperature controls hereinbefore described. Although the quantity of reducing gas employed must be adjusted in relation to changes in iron content in the ore, this ratio quotient range must be maintained. This ratio quotient is hereinafter referred to as the value K or constant K.

The advantages following from the maintenance of the constant K within the prescribed limits has not only been proved in actual operations but may be seen to follow from theoretical considerations. The relationship of this constant K to the reduction reaction during the heating in the reduction furnace is illustrated on the attached graph constituting Figure 1 of the drawing. Referring to this Figure 1, constants K as ordinates are charted against temperatures in degrees Fahrenheit as abscissas. In the upper part of the graph there is an experimentally determined line A—A representing the line of equilibrium between nickel oxide and nickel in atmospheres of carbon dioxide and carbon monoxide. In the lower portion of the figure, there is a branched line, also experimentally determined, having three segments, one segment designated as B—B' constituting the equilibrium line between ferroso-ferric oxide and metallic iron; another segment B'—C constituting the equilibrium line between ferroso-ferric oxide and ferrous oxide, and a third segment B'—D constituting the equilibrium line between ferrous oxide and metallic iron, all in carbon dioxide-carbon monoxide gaseous mediums.

Under the conditions represented by all points in the graph above line A—A, iron as ferroso-ferric oxide and nickel oxide remain unchanged. However, if the mixed oxides are heated under the conditions represented by points below this line A—A and above line B—B'—C, the nickel content is reduced to the metallic state but the iron oxide is unchanged. If the mixed oxides are subjected to treatment under conditions represented by points on the graph below the line B—B' or below the line B'—C but above B'—D, the ferroso-ferric oxide is reduced to metallic iron or to ferrous oxide depending upon whether the temperature is above or below about 1060° F.

To facilitate ascertainment of percentages of carbon dioxide and carbon monoxide in the gas mixtures represented by various values of the constant K, two columns of figures are inserted on the right side of the graph.

From this graph of Figure 1 it is evident from theoretical considerations that complete control of the ratios of carbon dioxide to carbon monoxide, i. e., the constant K, and the temperature of the ore enables the operator to control the course and extent of the reduction of its nickel and iron contents.

The time factor of heating is economically important both as to heat loss by radiation and as to through-put rate of ore in a continuous furnace. Hence the value of the constant K is maintained as far below the line A—A as permissible in obtaining the desired reduction, for the reduction of the nickel oxide occurs more rapidly when the "distance potential" from the equilibrium line A—A is the greatest. Since reduction of the iron must be avoided to permit successful operation of the subsequent selective solvent step and to prevent wasteful consumption of carbon monoxide by the iron, the value of the constant K should, according to theoretical considerations, be maintained at values just above the line B—B'—C, as for example, within the shaded area. In actual practice, however, it has been found that greater economy of reducing gases leading to good over-all operations and results can be obtained by the partial utilization of constants somewhat below the line B—B'—C. For example, said results are obtained by operating the reduction process utilizing a value of K of .6 in the furnace at the lower levels thereof where the ore temperatures are highest, i. e., at 1300–1400° F., and in operating at progressively higher values at the higher levels in the furnace where the temperature is lower. By operating in this manner, there is a lesser proportion of carbon monoxide in the gases leaving the reduction zone of the furnace and hence the operation is more economical.

As hereinbefore stated, the content and amount of the heating gases must be correlated with the amount of reducing gases employed. The quantity of heat necessary to raise the temperature of the ore to the final reducing temperature has been found not to vary appreciably with changes in the iron content of the ore. Consequently, into any particular multi-hearth or other furnace selected, and without regard to the iron content, there is introduced a volume of hot combustion gases adapted to effect the hereinbefore mentioned gradual increase in temperature of preferably between 6 and 10° F. per minute during reduction of the nickel oxide. This result is ordinarily obtainable however only by introducing the heating gases at several different levels or intervals at temperatures which are not more than about 200° F. higher than the temperature of the ore at the moment of initial contact.

As one of its features, the present invention contemplates combining the heating gases and the reducing gases before introduction into the ore in such manner as to obtain the gradual heating required and the optimum reducing atmosphere throughout the reduction operation, in a most economical way. Combustion gases can be produced at substantially any temperature desired by using excess air but since any appreciable amount of air must not be admitted to the reduction furnace, this method of temperature control is not permissible in the operation of the present invention.

In the operation of the instant process, oil or other combustible fluid is burned, as far as possible without any excess air, in one or more combustion chambers separate from the reduction furnace.

The combustion gases which otherwise would be at too high a temperature to handle successfully are tempered in accordance with the invention by adding relatively cool reducing gases directly into the combustion chamber or chambers in a quantity which provides mixtures at about 2800° F. These gases at 2800° F., mixed with the gases already in the furnace passing up from hearths below raise the temperature level of the furnace gases and maintain the desired temperature differential between gases and ore of 150°–200° F. necessary to effect the regulated ore heating.

In development of the present process, it has been found that producer gas at the satisfactory temperature of 100° F. can be mixed with the required volume of combustion gases and at one and the same time temper the same to 2800° and also provide a gaseous atmosphere within the furnace of an operable carbon dioxide-carbon monoxide ratio or constant K. Generally, however, this mixture leads to a final constant K which is lower than is required for satisfactory operation and this means an uneconomic consumption of carbon monoxide.

In accordance with a preferred embodiment of the invention, the above objection is overcome by recycling some of the partially spent reducing gases leaving the reducing zone in the furnace, which gases after being scrubbed and cooled, as to 100° F., for example, are utilized for the dual function of providing a reducing atmosphere and of cooling the hot combustion gases in the manner hereinbefore indicated. Since the recycle gases are poorer in carbon monoxide than producer gas, a system of maximum flexibility is obtained by providing means for utilizing both recycle gas and producer gas in any desired proportion in admixture with the combustion gases. The thermal characteristics of the recycle gas and the producer gas under the conditions here employed are practically the same and each can be substituted for the other in any proportion without causing appreciable variation in the temperature of the heating gases.

Figure 2:
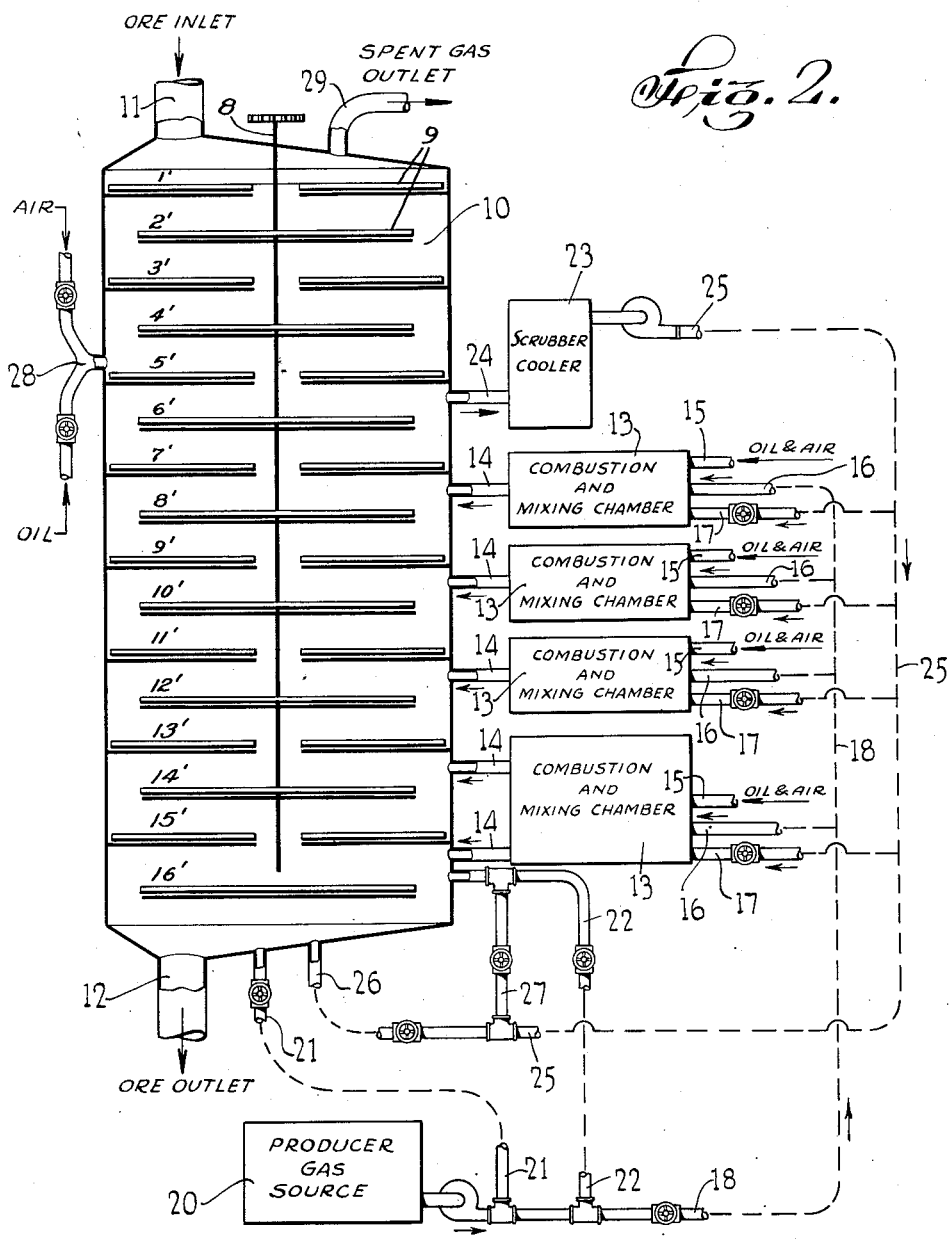

The preferred furnace system in which the instant processes may be carried out is illustrated in Figure 2 of the drawing. Here there is diagrammatically represented a multi-hearth furnace 10 of a throughput capacity of, for example, 13 tons of dry ore per hour which furnace is provided with sixteen hearths numbered 1'–16', beginning at the top. Conventional means are employed for causing the ore to pass through the furnace from top to bottom, which means comprises a drive shaft 8 and a series of paddles 9 adapted in the conventional way to scrape the ore alternately in an inward direction on half of the hearths and in an outward direction on the other half. The furnace is provided with an ore inlet conduit 11 at the top and an ore outlet conduit 12 at the bottom, a plurality of combustion and mixing chambers 13 (four of them being illustrated) connects through conduits 14 with the furnace at various levels between the top and the bottom. These combustion and mixing chambers 13 are provided with fuel oil and air inlet conduits 15, producer gas inlet conduits 16 and recycle gas inlet conduits 17.

The producer gas inlet conduits 16 are connected to a manifold conduit 18 in turn connected to a producer gas source 20. This source 20 is also connected through a conduit 21 to the bottom of the furnace 10 at a point below the hearth 16'. It is also connected through a conduit 22 to the furnace 10 at a point above the bottom hearth 16'.

The system is also provided with a scrubber cooler 23 connected through the conduit 24 to the furnace 10 at a point just below hearth number 5'. It is also connected through a manifold conduit 25 to the recycle gas inlet conduits 17 leading to the combustion and mixing chambers 13. This manifold conduit 25 is also connected to the bottom of the furnace 10 at a place below the hearth 16', through the conduit 26 and to the furnace at a point above the hearth 16' through the conduit 27.

The furnace is also provided with an inlet conduit 28 connected immediately above hearth number 5' for the introduction of air, or of air and fuel oil or other heating agent. At the top of the furnace 10 there is an outlet conduit 29 for the discharge of the spent gases.

All of the inlet and outlet conduits described above are provided with the necessary pumps and valves or dampers to permit complete control of the fluids which may flow therethrough, thereby to accomplish successful operation of any of the processes herein disclosed. Some of these auxiliary devices are illustrated but others may be added where necessary.

In the above-described furnace system, it will be observed that the furnace may be considered as having three zones serving three different functions. In accordance with the preferred process of the present invention, the area of the upper hearths (of the top five hearths, for example) constitutes an ignition section for preheating the ore to a reduction temperature. The area of the intermediate hearths (for example, those numbered 6'-15') constitutes a reducing section, and that of the lower hearths or of just hearth 16' constitutes a cooling section.

Operation of the process of the invention contemplates, in its preferred embodiment, passing the ore from the top to the bottom of the furnace countercurrent to the heating and reducing gases. Since the gases passing upwardly from the hearth 6' contain, and must contain, an appreciable percentage of left over carbon monoxide as dictated by the established constant K, such gases can serve at least in part to pre-heat the ore while it is in the area of the top five hearths. Air is introduced through the conduit 28 to permit this ignition. Additional heat, if needed, may be obtained by the introduction of fuel oil and additional air through the conduit 28.

The finely divided ore entering the inlet 11 at the top of the furnace is heated preferably to about 1000° F. in passing from the ore inlet to the fifth hearth. In descending through the furnace from hearth 6' to 15' inclusive, the ore is progressively and gradually heated to a final temperature of from 1300° to 1400° F. and its nickel content is reduced to the metallic state. The gradual heating and reduction is accomplished by the introduction of combustion gases tempered with reducing gases injected at the various levels through the conduits 14, the amount of carbon monoxide introduced being that which maintains the constant K within the range hereinbefore disclosed.

The hearth 16', in the preferred operation of the process, serves to cool the ore and at the same time to conserve the sensible heat of the ore to be discharged from the ore outlet 12. The producer gas and/or recycle gas having a temperature of for example 100° F. are introduced into the furnace through the conduits 21 and 26 in a quantity which lowers the ore temperature from, for example, 1300° F. to 950° F. Under some circumstances the hearth 16' is not utilized to cool the ore, and in this case, the producer gas and/or recycle gas are introduced into the furnace at a point above the hearth 16' through the inlet conduits 22 and 27.

Although operation anywhere within the range of the constant K hereinbefore set forth for the reduction of the nickel content in nickeliferous lateritic iron ore leads to satisfactory reduction results, optimum economic results can be achieved only by operating at experimentally determined specific constants K during the whole reduction period or at every different level in the furnace. Different ores from various deposits or variations in the nickel and iron content in ore from the same deposit require for optimum results that the constant K be maintained within predetermined limits initially, finally, and at intermediate points.

The furnace system herein described not only provides for the necessary control of K throughout any single operation but also for the extremely easy adjustment of K to suit any required change to obtain optimum reduction results. The versatility is apparent from the following description of furnace operations in which the K is shown to be adjustable to a surprising degree by changing the distribution of the reducing gases at the various levels in the furnace and without changing either the total quantity of combustion gases employed (likewise, the fuel oil burned) or the total quantity of the producer gas used, or, of any mixture of producer gas and recycle gas if the same be employed.

Figure 3:
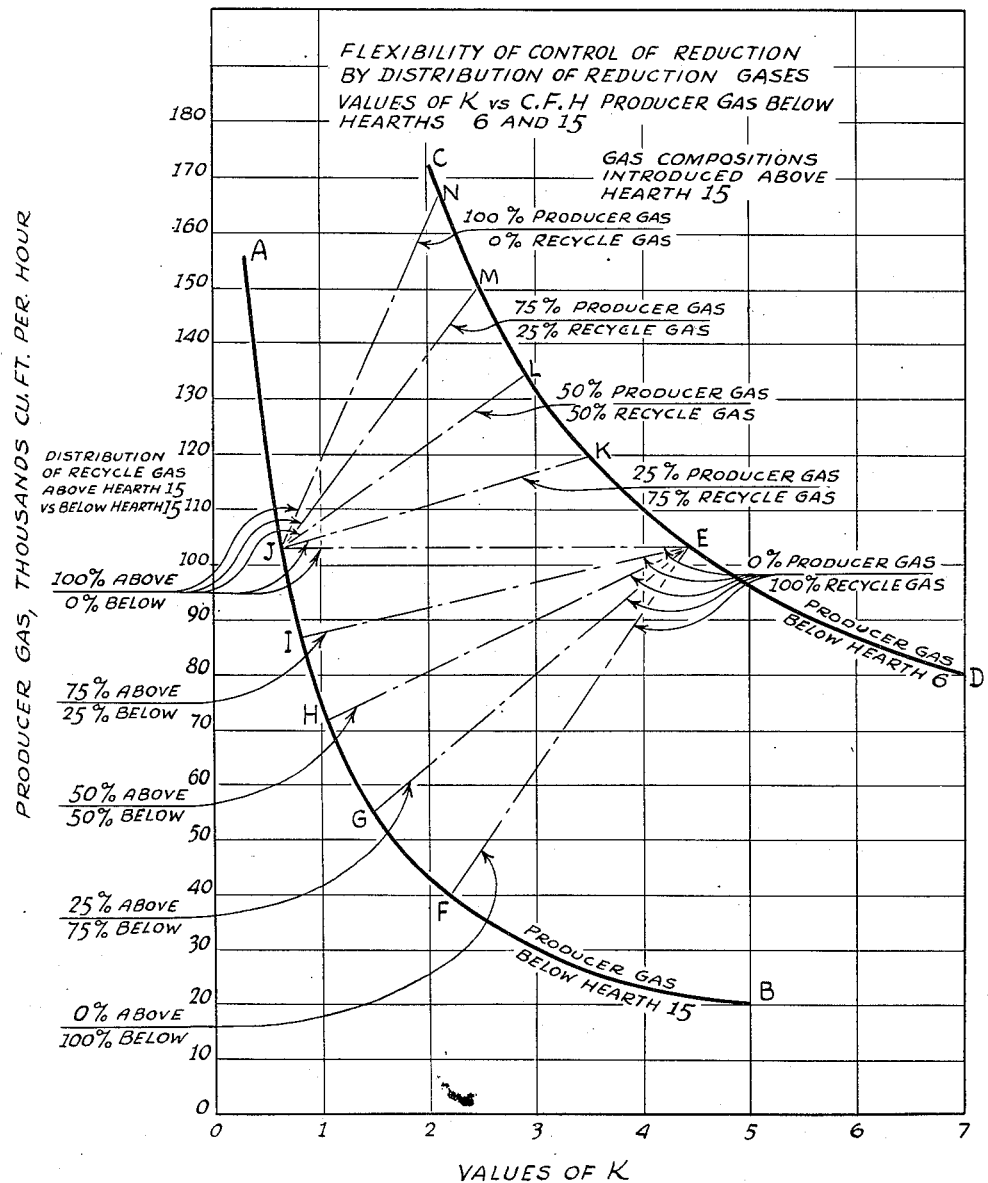

Variations in composition of the gaseous atmosphere in furnace operations and its control within wide limits are well illustrated in the graph constituting Figure 3 of the drawings. Here quantities of producer gas in thousands of cubic feet per hour as ordinates are plotted against values of K as abscissas.

Points on this graph represent producer gas quantities and values for K found useful in a typical multi-hearth furnace under conditions where the total reducing gas (both producer and recycled furnace gas) is 166,000 cubic feet per hour. It should be borne in mind for understanding this graph that the calculations are based on a constant ore feed rate of a specific ore and upon a constant volume of combustion gases introduced into the system and in the separate combustion chambers. The sum of the volumes of producer gas and recycle gas introduced is also constant, not only that admitted to the whole system but also that introduced at each point of admission. These conditions are necessary to maintain constant the hereinbefore mentioned predetermined rate of ore temperature increase in the reduction zone.

On the graph of Figure 3, a line A—B contains all of the points for K between 20,000 cubic feet per hour and 150,000 cubic feet per hour of producer gas introduced below hearth 16'. The line C—D indicates all of the points for K between 80,000 cubic feet per hour and 170,000 cubic feet per hour of producer gas introduced at all points below hearth 6' without regard to the specific point or points at which such producer gas is admitted to the system below said hearth.

From these two curves it can be seen that by choosing any particular total quantity of producer gas introduced below hearth 6', as 103,000 cubic feet of producer gas per hour indicated by point E on the drawing, and joining this point with various points on line A—B indicating the amount of producer gas through hearth 15', as at F, G, H, I, or J, the range of K in the reducing section of the furnace can be varied between the initial values of 2.2 and 0.6 without varying the value of K (4.4) at hearth 6' (line E—F on the drawing and also line E—J on the drawing) by simply changing the distribution of the same total of producer gas introduced into the respective hearths at the various levels.

Since points E, F, G, H, I, and J, represent only the initial and final values of K, the lines E—F, E—G, E—H, E—I, and E—J, connecting the points of curve C—D with curve A—B obviously do not represent the paths or intermediate changes of K through the hearths of the furnace.

The area bounded by lines J—E, F—E, and J—F, is for a particular ore condition requiring 103,000 cubic feet of producer gas per hour thus permitting the use of 63,000 cubic feet of cooled furnace or recycle gases. Line J—E indicates that K will increase from 0.6 to about 4.5 if all the producer gas is introduced below hearth 15' and all of the recycled furnace gas is used to cool the combustion gases. Line I—E shows that K will increase from 0.8 to about 4.5 if 87,000 cubic feet of producer gas per hour are introduced below hearth 15' together with 16,000 cubic feet of recycle gas per hour; and the remainder, that is, 16,000 cubic feet of producer gas and 47,000 cubic feet of recycle gas per hour, is distributed to the combustion chambers. In operating according to this line I—E, 25% of the recycle gas is introduced through hearth 15'; according to line H—E, 50% of the recycle gas is passed through hearth 15'; to line G—E, 75% and to line F—E, 100%.

If the ore treated is of quite refractory character, it is not desirable to operate within the limits of the above-described area bounded by lines J—E, F—E, and J—F. For satisfactory results in the treatment of such ores, it is necessary to use amounts greater than 103,000 cubic feet of producer gas per hour or up to 166,000 cubic feet per hour, which amounts are within the area bounded by lines N—J, J—E, and E—N, on Fig. 3. When these larger quantities of producer gas are employed, the total gas volumes remain the same as before since the thermal requirements are the same, but the range of K is both narrower and lower since more producer gas is used. Line J—N delineates a constant K of 0.6 to 2 caused by introducing 103,000 cubic feet of producer gas per hour below hearth 15' with 63,000 cubic feet of producer gas and no recycle gas used to dilute the combustion gases in the combustion chambers. Line J—M provides an increased value of K from 0.6 to 2.5 by introducing 103,000 cubic feet of producer gas per hour below hearth 15', and 47,000 cubic feet of producer gas with 16,000 cubic feet of recycle gas per hour distributed among the combustion chambers. For line J—M the combustion chamber cooling gas is therefore about 75% producer gas. Similarly for line J—L, it is 50%, for line J—K it is 25%, and for line J—E, it is 0%.

It is apparent that the present process can be operated under an infinite variety of conditions indicated by the area bounded by the lines F—E, E—N, N—J, and J—F, all of which require either 103,000 cubic feet of producer gas or mixtures of producer gas with recycle gas to be introduced below hearth 15' and mixtures of producer gas and recycle gas with a total volume of 63,000 cubic feet per hour to be introduced through the combustion chambers in the reduction furnace.

From the foregoing description, it is clear that the path or course of K may be considerably varied to suit specific requirements by merely redistributing a constant volume of the reducing gases between the various intermediate hearths. It should be understood, however, that the value of K on any hearth is determined not only by the volume and composition of the gas introduced on that hearth but as well by the gas coming to that hearth from the hearths below.

For different furnace sizes and rates of operation, the gas relations are different but similar families of lines may be computed showing the variations of values of K which are possible while the thermal conditions in the furnace remain the same.

It is obvious from the foregoing discussion that similar data and curves can be devised to show an infinitely large number of variations in the operation of reduction furnaces using different factors, such as mixtures in various proportions of producer gas and recycle gas and using different reaction rates and temperatures.

Figure 4:
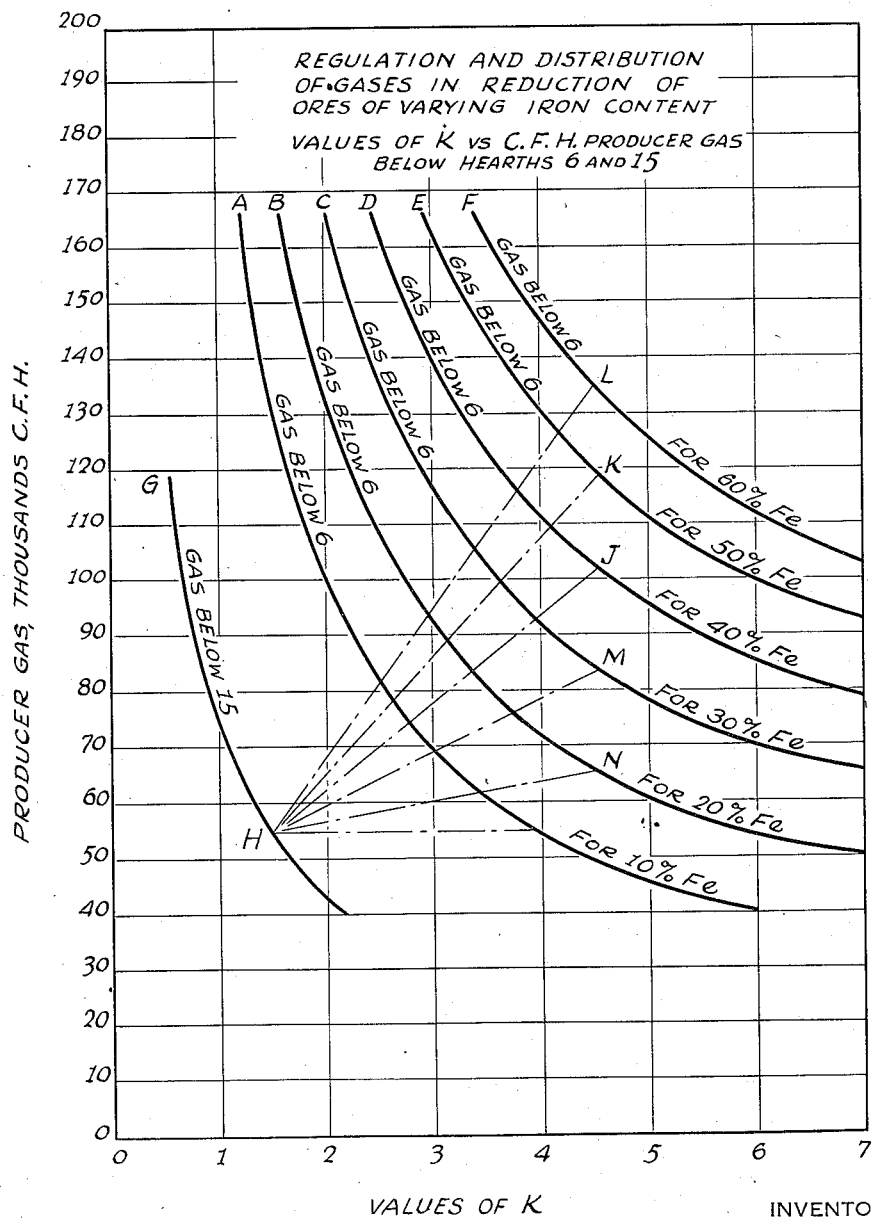

In order to illustrate the flexibility of the instant process and its ease of adaptation in obtaining optimum results in the treatment of ores in which the iron content is from time to time changing, a graph constituting Figure 4 is included in the drawings. Here the quantities of producer gas in thousands of cubic feet per hour are set out as ordinates and the values of K as abscissas. A series of curved lines, A, B, C, D, E, and F thereon represent the total quantities of producer gas calculated to be necessary to maintain the values of K for the respective percentages of iron in the range of 10% and 60% as set out on the drawing. The line G on the graph represents the amounts of producer gas and resulting values of K at hearth number 15', applicable to all of such ores.

Line H—J of Figure 4, together with lines D and G are the same as lines G—E, C—D, and A—B in Figure 3 and show the use of 55,000 cubic feet of producer gas mixed with 48,000 cubic feet of recycle gas introduced below hearth 15', with 48,000 cubic feet of producer gas and 15,000 cubic feet of recycle gas introduced through the combustion chambers. These conditions with an ore containing 40% iron will give a range of K of 1.5 to 4.5, as in Figure 3. When the ore of higher iron content is treated in order to keep the same range of K, the total producer gas must be increased to the amounts, for example, shown at K and L on lines E and F the amount introduced below hearth 15' being kept constant at 55,000 cubic feet per hour, as shown by the lines H—K and H—L. In these operations, the amount of recycle gas introduced into the combustion chambers is reduced correspondingly so that the total of producer and recycle gas shall always be 166,000 cubic feet per hour.

Similarly, for ores containing less than 40% iron, initial and final K may be kept at 1.5 and 4.5 by decreasing the amount of total producer gas introduced into the system to the amounts shown at M and N for 30% and 20% iron respectively. Conditions at hearth 15' are kept the same as before, but the quantity of recycle gas introduced into the combustion chamber is increased so as to make the total producer and recycle gas 166,000 cubic feet per hour.

With an ore as low as 10% iron, the final K cannot be kept as high as 4.5 if the initial K is 1.5, since the amount of producer gas (55,000 cubic feet per hour) introduced below hearth 15' is sufficient to produce a final K of only 3.9 when no producer gas is added to the combustion chambers and the total of producer and recycle gas is maintained at 166,000 cubic feet per hour as is necessary to maintain the thermal relationships.

Different ranges of K to suit different ores with varying iron content can be devised following Figure 4 in the same way different ranges of K were obtained for an ore of uniform iron content in Figure 3. The one range of K values for ores of different iron content set out on Figure 4 is thought sufficiently illustrative of the versatility of the instant reduction process. Obviously other ranges of K values can be worked out to fit other thermal requirements.

In the foregoing description of the method of carrying out the invention it should be understood that actual operation has been somewhat simplified and idealized in the interests of clarity. For example, when hearth 16' is used as an ore cooling hearth and consequently as a gas-heating and heat recovery hearth, the value of K at hearth 15' changes slightly because some reduction of iron from higher to lower oxides takes place on this hearth by action of carbon monoxide in the gas. Also, under economical operating conditions, the ore passage through the hearths is too rapid for complete equilibrium to take place above the cooling hearth. Finally, variations in iron content of the ore change the heat relationships slightly. However, if such minor effects were introduced into the herein-contained calculations and analyses, the clear exposition of the invention would be somewhat obscured.

Although the present process has been particularly developed for the reduction of nickeliferous lateritic ores containing iron, it is also applicable to other ores where very carefully controlled reduction conditions are required. The process of the invention is furthermore not limited to operation in the specific multi-hearth furnace herein described. The process, for example, can be carried out in other multiple-hearth furnaces and also in continuous rotary kilns provided with suitable axial inlets for the introduction of heating and reducing gases at various points within the kiln. With properly controlled operation, such kilns can be caused to effect the gradual temperature rise rate hereinbefore described.

The process of the invention can also be used in any type of furnace where it is desirable to regulate the temperature without changing to any substantial extent the composition of the gaseous atmosphere therein. For example, it may be applied to a fluid flow system in which a finely divided solid is kept suspended in a gas stream passing through a series of reaction chambers. In such a system, gas may be withdrawn from any of the reaction chambers and after being cooled can be mixed with combustion gases and be reintroduced into the system at another point or at several points.

The multi-hearth furnace system herein described is satisfactory for the reduction of any ore requiring careful regulation of the heating and reducing atmosphere and especially where selective reduction of metals is desired. In a rotary kiln system, partially consumed gases can be withdrawn from any point within the kiln through a centrally placed pipe and after the same is cooled in a scrubber, it can be introduced into the kiln at one or more points, as at the hot end of the kiln, thereby to achieve the qualitative effect similar to that obtained by the operation of the process in the multi-hearth furnace, as hereinbefore described.

It should be understood that the present invention is not limited to the specific details of operation or construction herein given, but that it extends to all equivalent operations and constructions which will occur to those skilled in the art upon consideration of the principles and modes of operation herein described.

We claim:

1. In the selective reduction of the nickel content of oxide ores containing iron and nickel by means of heating gases and reducing gases contacted with the ore during its passage through a furnace, the process of controlling the temperature and reduction characteristics of the gaseous atmosphere in the furnace which comprises, introducing in regulated amounts at regulated temperatures hot flue gases in admixture with partially spent reducing gases theretofore withdrawn from said furnace, into the reducing gas atmosphere in contact with the ore at one or more points between the ore inlet and the ore outlet of the furnace, thereby altering both the temperature and the $CO:CO_2$ ratio in the gas atmosphere and accomplishing desired control.

2. In the selective reduction of the nickel content of oxidic ores containing iron and nickel by means of heating gases and reducing gases contacted with the ore during its passage through a furnace, the process of controlling the temperature and the reduction characteristics of the gaseous atmosphere in the furnace which comprises, introducing in regulated amounts at regulated temperatures a mixture of hot flue gas, producer gas and partially spent reducing gases theretofore withdrawn from said furnace into the reducing atmosphere in contact with the ore at one or more points between the ore inlet and the ore outlet of the furnace, thereby altering both the temperature and the $CO:CO_2$ ratio in the gas atmosphere and accomplishing desired control.

3. In the recovery of nickel from nickeliferous lateritic ores in a continuous reduction furnace, the steps by which the nickel is selectively reduced which comprise raising the temperature of the ore to a reduction temperature by means of combustion in the upper portion of the furnace, gradually raising the temperature of ore in the reduction zone in the lower portion of the furnace by introducing into the gaseous atmosphere therein at a plurality of points along the path of the ore therein, externally produced tempered hot flue gases substantially free of oxygen, withdrawing from the furnace partially spent reduction gases leaving the reduction zone, cooling said gases, mixing the same with hot flue gases thereby tempering the same before they are introduced into the reducing gas atmosphere in contact with the ore.

4. The process of selectively reducing the nickel content in an ore containing nickel and iron oxide compounds, which comprises passing such ore pre-heated to a reducing temperature through a reducing chamber, heating the ore and gradually increasing its temperature to a final temperature between about 1000° and 1400° C. by means of combustion gases introduced into said chamber and maintaining said gradual rate of temperature increase and as well the ratio quotient of carbon dioxide to carbon monoxide between about .4 and 6 by recycling partially spent reducing gases and introducing the same together with producer gases into the reduction zone at a plurality of points along the path of the ore during its passage through the reducing chamber.

5. The method of operating a multiple-hearth furnace in the reduction of an oxidic ore containing varying percentages of iron and nickel compounds to be reduced, which comprises, passing the ore through the furnace countercurrent to a gaseous mixture containing combustion gases and producer gases, introducing hot flue gases tempered with partially spent cooled reducing gases withdrawn from the furnace into the gaseous atmosphere in the furnace, maintaining the ore throughput and the gas volume introduced and also the gas temperature substantially constant, and adjusting the relative proportion of producer gas and partially spent reducing gases introduced into the furnace in relation to the percentage of oxides present in the ore introduced.

6. In the recovery of nickel from nickeliferous lateritic ores, the process of reducing the nickel at a maximum rate without reducing the iron to the Fe and FeO state which comprises, passing the ore pre-heated to a reducing temperature through a reducing chamber, heating said ore gradually therein at a uniform rate by means of externally produced combustion gases, the temperature of which has theretofore been tempered by the addition of reducing gases, and maintaining in said chamber throughout the reduction period an atmosphere having a ratio quotient of carbon dioxide to carbon monoxide within the rance of from .4 to 4 by introducing into the reducing chamber at a plurality of points along the path of the ore therein partially spent reducing gases theretofore withdrawn from the reduction chamber.

7. The process of treating nickeliferous lateritic ores whereby the nickel is reduced substantially to the metallic state and the iron substantially only to the $Fe_3O_4$ state, which comprises, passing the ore pre-heated to a reducing temperature through a reduction chamber of a reduction furnace, heating said ore during said passage by introducing into direct contact therewith externally produced combustion gases tempered by the addition of partially spent cool reducing gases withdrawn from said chamber and in a quantity and at a temperature which gradually increases the temperature of the ore to a final point between 1000° and 1400° C. as the same passes through the furnace, introducing into said ore said partially spent reducing gases in admixture with said combustion gases in a proportion which maintains the carbon dioxide to carbon monoxide ratio quotient within the range of .4 and 6 whereby the nickel content is rapidly and substantially completely reduced and said iron reduction to the Fe and FeO state is maintained at a minimum.

ROBERT C. HILLS,
MAURICE F. DUFOUR.

REFERENCES CITED

The following references are of record in the file of this patent:

UNITED STATES PATENTS

| Number | Name | Date |
| --- | --- | --- |
| 1,466,382 | Pike | Aug. 28, 1923 |
| 1,549,379 | Pike | Aug. 11, 1925 |
| 1,588,217 | Winkelman | June 8, 1926 |
| 1,627,215 | Truesdell | Nov. 3, 1927 |
| 1,647,050 | Mackay | Oct. 25, 1927 |
| 1,940,246 | Clark | Dec. 19, 1933 |
| 2,000,171 | Gronningsaeter | May 7, 1935 |
| 2,067,874 | Brown et al. | Jan. 12, 1937 |
| 2,212,459 | Simpson | Aug. 20, 1940 |
| 2,333,111 | Lykken | Nov. 2, 1943 |
| 2,341,873 | Kissock | Feb. 15, 1944 |
| 2,345,067 | Osann | Mar. 28, 1944 |
| 2,400,098 | Brogdon | May 14, 1946 |

FOREIGN PATENTS

| Number | Country | Date |
| --- | --- | --- |
| 475,254 | Great Britain | Nov. 16, 1937 |
| 35,948 | France | Dec. 19, 1929 |
| | (Addition to No. 603,188) | |

OTHER REFERENCES

Bureau of Mines Bulletin No. 270, Production of Sponge Iron, U. S. Printing Office, Washington, D. C., 1927.